United States Patent [19]

Frentzel

[11] Patent Number: 4,481,307

[45] Date of Patent: Nov. 6, 1984

[54] POLYOXYALKYLENE/UNSATURATED DIESTER REACTION PRODUCT FOR CELLULAR FOAM STABILIZATION

[75] Inventor: Richard L. Frentzel, Clearwater, Fla.

[73] Assignee: The Celotex Corporation, Tampa, Fla.

[21] Appl. No.: 544,301

[22] Filed: Oct. 21, 1983

Related U.S. Application Data

[62] Division of Ser. No. 426,581, Sep. 29, 1982, Pat. No. 4,418,158, which is a division of Ser. No. 282,322, Jul. 10, 1981, Pat. No. 4,365,024.

[51] Int. Cl.³ .............................................. C08J 9/14
[52] U.S. Cl. ..................................... 521/115; 521/114; 521/116; 521/133; 521/160; 521/902; 521/911
[58] Field of Search ............... 521/115, 114, 116, 133, 521/160, 902

[56] References Cited

U.S. PATENT DOCUMENTS

| | | | |
|---|---|---|---|
| 3,304,273 | 2/1967 | Stamberger | 260/2.5 |
| 3,383,351 | 5/1968 | Stamberger | 260/33.2 |
| 3,546,321 | 12/1970 | Jabloner et al. | 260/814 |
| 3,779,959 | 12/1973 | Pinten et al. | 260/2.5 |
| 3,914,188 | 10/1975 | Carroll et al. | 521/129 |
| 4,140,842 | 2/1979 | Beale et al. | 260/37 N |
| 4,250,077 | 2/1981 | Von Bonion et al. | 260/37 N |
| 4,365,024 | 12/1982 | Frentzel | 521/114 |
| 4,418,158 | 11/1983 | Frentzel | 521/115 |

Primary Examiner—Morton Foelak
Attorney, Agent, or Firm—James W. Grace; Charles W. Vanecek

[57] ABSTRACT

Polyoxyalkylene surfactants for cellular foams can be prepared by reacting a polyoxyalkylene adduct and an esterified unsaturated dibasic acid in the presence of a free-radical initiator.

17 Claims, 3 Drawing Figures

POLYOXYALKYLENE/UNSATURATED DIESTER REACTION PRODUCT FOR CELLULAR FOAM STABILIZATION

This is a division of application Ser. No. 426,581, filed Sept. 29, 1982, now U.S. Pat. No. 4,418,158, which is a division of application Ser. No. 282,322, filed July 10, 1981, now U.S. Pat. No. 4,365,024.

BACKGROUND OF THE INVENTION

1. Field of the Invention

This invention relates to the preparation of novel surfactants and their utilization in producing cellular foam materials, particularly phenolic, isocyanurate and urethane foams. The surfactants can be prepared by reacting under free radical polymerization conditions a polyoxyalkylene adduct and an esterified unsaturated dibasic acid.

2. Description of the Prior Art

It is known in the manufacture of cellular polymeric materials to utilize small quantities of various cell stabilizing additives, such as silicones, in order to improve the foam's cell quality. While the silicone surface active agents contribute to the production of foamed products having a combination of desirable properties, silicone surfactants are relatively expensive materials.

Another highly effective cellular foam stabilizer of the prior art is the capped reaction product of an alkoxylated amine and a copolymerizable mixture of dialkyl maleate and N-vinyl-2-pyrrolidinone or N-vinyl caprolactam, which is disclosed in U.S. Pat. No. 4,140,842. However, this foam stabilizer is also relatively expensive and has been found to consist of a complex mixture whose components must be separated from each other to realize their particularly desirable cellular foam stabilizing properties.

It would accordingly be highly desirable to provide a novel surface active agent which would be relatively simple and inexpensive to produce and still have good foam stabilizing characteristics.

OBJECTS OF THE INVENTION

It is therefore an object of the present invention to provide a novel class of surfactants for use in preparing fine, closed-cell foam materials, particularly phenolic, isocyanurate and urethane foams, and a method of producing the surfactants, as well as a method of producing the foams by use of the surfactants.

It is another object of the present invention to provide closed cell polymeric foam materials of high quality and laminated building panels employing the foam materials.

It is still another object of the present invention to produce closed cell polymeric foam materials with high thermal resistance and high insulation properties and a relatively slow increase in thermal conductivity with time.

It is a further object of the present invention to produce polymeric foam materials which exhibit a high closed cell content without adversely affecting friability, compressive strength and the low flammability characteristics of the materials.

It is a still further object of the present invention to provide closed cell polymeric foam materials which can be used in building panels which are highly insulating, thermally resistant, low in friability, soundproof and self-supporting.

These and other objects and advantages of the present invention will become more apparent by reference to the following detailed description and drawings wherein.

DESCRIPTION OF THE INVENTION

Figure 1:
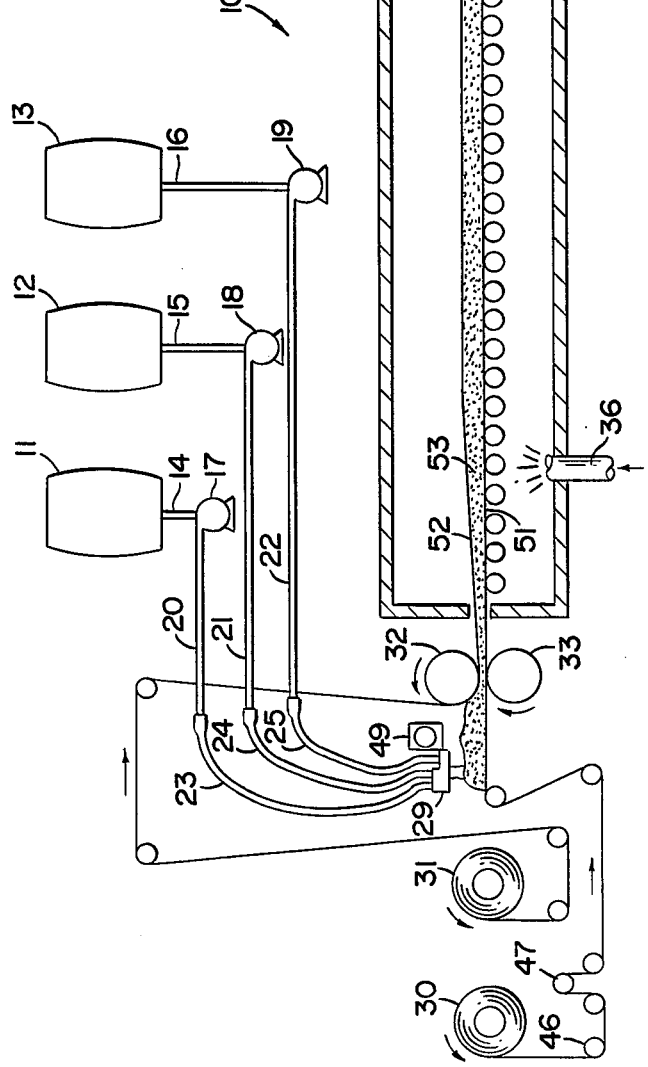
FIG. 1 is a side schematic representation of an apparatus suitable for producing a cellular foam material in accordance with the present invention.

The above objects have been achieved by the development of an improved surfactant for foam materials, particularly phenolic, isocyanurate and urethane foams, which is the reaction product of an unsaturated diester and a polyoxyalkylene adduct.

More particularly, the foam surfactant of the present invention comprises the reaction product of an esterified unsaturated dibasic acid containing 4 or 5 carbon atoms and a polyoxyalkylene adduct in the presence of a free radical initiator. The unsaturated diester can be prepared by reacting together an unsaturated dicarboxylic acid or acid derivative with an alcohol whose hydrocarbon radical can be saturated or unsaturated. The unsaturated diester can also be prepared from a mixture of alcohols.

In the broadest aspects of the present invention, the esterified unsaturated dibasic acid can be reacted with any conventional polyoxyalkylene adduct. The polyoxyalkylene adduct can be represented by the structural formula

wherein R is an organic or inorganic radical and t is the number of polyoxyalkylene chains reacted onto the R backbone. Preferably, R is an organic radical selected from aromatic, aliphatic, cycloaliphatic, and heterocyclic radicals, and combinations of these, and t is an integer from 1 to 50, more preferably 1 to 8, most preferably 1 to 4. Included among the conventional polyoxyalkylene adducts which can be employed as starting materials are anionic, cationic and nonionic type surfactants. These surfactants may be used either alone or in admixture with each other. Non-ionic type surfactants are preferred.

Among the conventional polyoxyalkylene adducts which can be employed are the alkylene oxide adducts of:

(a) Mono- and polyhydroxyalkanes and mono- and polyhydroxycycloalkanes;
(b) Alkanolamines;
(c) Mono- and polyamines;
(d) Non-reducing sugars and sugar derivatives;
(e) Aromatic amine/phenol/aldehyde condensation products;
(f) Phosphorus and polyphosphorus acids;
(g) Mono- and polyhydric phenols;
(h) Amides;
(i) Organic carboxylic acids;
(j) Hydroxyl containing triglycerides;
(k) Polysiloxanes; and the like.

The adducts are prepared in known manner. Preferably, the alkylene oxides employed in the adduct formation have 2 to 4 carbon atoms, for example, ethylene oxide, 1,2-epoxypropane, the epoxybutanes, and mixtures thereof. Mixed propylene oxide-ethylene oxide adducts have proved especially useful. In the preparation of the latter adducts, the ethylene oxide and propylene oxide are advantageously reacted in the molar ratio of 10:90 to 90:10.

It has been found that the molecular weight and alkylene oxide content of the conventional polyoxyalkylene adducts can play an important role in determining the cell stabilizing capacity of the surfactants of the invention. More specifically, certain adducts have been found to require a minimum ethylene oxide or propylene oxide content and molecular weight for more efficient cell stabilization. These requirements can vary for different polyoxyalkylene adducts and foam systems but it is possible to establish the satisfactory values for any given foam through routine experimentation.

Advantageously, the mono- and polyhydroxyalkanes and mono- and polyhydroxycycloalkanes to be alkoxylated for use in the present invention can have from 1 to 8 hydroxyl groups. Illustrative alcohols for alkoxylation include, among others, ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, 3,4-dihydroxycyclopentane, tetramethylolcyclohexanol, cyclohexanediol, fatty alcohols, high molecular weight polyoxyalkylene glycols; and the like.

Another useful class of polyoxyalkylene adducts which can be employed are the alkylene oxide adducts of alkanolamines. Illustrative alkanolamines include ethanolamine, diethanolamine, triethanolamine, triisopropanolamine, and tributanolamine.

Another useful class of polyoxyalkylene adducts which can be employed are the alkylene oxide adducts of mono- and polyamines. Mono- and polyamines suitable for reaction with alkylene oxides include, among others, methylamine, ethylamine, isopropylamine, butylamine, benzylamine, aniline, the toluidines, naphthylamines, ethylenediamine, diethylene triamine, triethylenetetramine, 4,4'-methylenedianiline, 1,3-butanediamine, 1,3-propanediamine, 1,4-butanediamine, 1,2-, 1,3-, 1,4-, 1,5- and 1,6-hexanediamine, phenylenediamines, toluenediamine, naphthalenediamines, and the like.

A further class of polyoxyalkylene adducts which can be employed are the alkylene oxide adducts of the nonreducing sugars and the nonreducing sugar derivatives. Among the nonreducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, and the like.

A still further useful class of polyoxyalkylene adducts are the alkylene oxide adducts of mono- and polyhydric phenols, including mononuclear dihydroxy benzenes, higher alkyl phenols, and polyphenols. Among the phenols which can be used are found, for example, catechol, resorcinol, orcinol, nonylphenol, bisphenol A, bisphenol F, condensation products of phenol and formaldehyde, more particularly the novalac resins, condensation products of various phenolic compounds and acrolein, the simplest members of this class being the 1,2,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenyl) ethanes, and the like.

Another desirable class of polyoxyalkylene adducts are the alkylene oxide adducts of aromatic amine/phenol/aldehyde condensation products. The condensation products are prepared by condensing an aromatic amine, for instance, aniline, toluidine, or the like, a phenol such as phenol, cresol, or the like, and an aldehyde, preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the adducts.

The alkylene oxide adducts of phosphorus and polyphosphorus acids are another useful class of polyoxyalkylene adducts. Phosphoric acid, phosphorous acid, the polyphosphoric acids such as tripolyphosphoric acid, the polymetaphosphoric acids, and the like are desirable for use in this connection.

Included among the polyoxyalkylene adducts of the present invention are the alkylene oxide adducts disclosed in U.S. Pat. No. 3,383,351, the teachings of which are hereby incorporated by reference.

Examples of commercially available polyoxyalkylene adducts for use in the present invention include Polyglycol 15-200 from Dow Chemical Company, Flo Mo 36 C and 5D from Sellers Chemical Corporation, ethoxylated sorbitan esters from Imperial Chemical Industries and Pluronics from BASF Wyandotte Corporation.

In an advantageous embodiment of the invention, the ester of the unsaturated dibasic acid used in preparing the cell stabilizers of this invention corresponds to the formula:

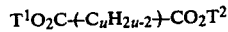

$$T^1O_2C-(C_uH_{2u-2})-CO_2T^2$$

wherein u is 2 or 3 and $T^1$ and $T^2$ are identical or different and represent a straight or branched, saturated or unsaturated hydrocarbon chain which preferably contains 4 to 18, more preferably 8 to 18, carbon atoms. Typical examples of the esters that may be used include dibutyl maleate, dibutyl fumarate, dibutyl itaconate, dioctyl methylenemalonate, diisooctyl maleate, dioctyl maleate, ditridecyl maleate, and dioleyl maleate, preferably dioleyl maleate, dioctyl maleate and ditridecyl maleate, most preferably ditridecyl maleate.

Evidence indicates that the mechanism by which the unsaturated diester reacts with the polyoxyalkylene adduct is by grafting, i.e., the reaction product is composed of the polyoxyalkylene adduct backbone to which are attached at intervals "grafts" of the unsaturated diester. In light of the known inability of unsaturated diesters of the invention to homopolymerize, it is believed that the mechanism of the reaction may involve the addition of single diester units to the polyoxyalkylene backbone. Even in cases where the amount of grafting is somewhat less than 100%, the reaction product nevertheless exhibits a cell stabilizing capacity. Unreacted unsaturated diester can be removed from the total reaction product by conventional methods, such as by solvent extraction. Since a substantial amount of unreacted diester can reduce stabilizer efficiency, excess diester should generally be removed from the reaction product. The reaction product of the invention includes both the total reaction product and the reaction product minus unreacted diester.

The surfactant compositions of the invention are produced by reacting together the unsaturated diester and polyoxyalkylene adduct in the presence of an effective amount of any conventional free-radical initiator known to be suitable for the graft polymerization of ethylenically unsaturated monomers. Illustrative initiators are the well-known free radical type of vinyl polymerization initiators, for example, the peroxides, persulfates, perborates, percarbonates, azo compounds, etc., including hydrogen peroxide, 1,1-bis(t-butylperoxy)cyclohexane, dibenzoyl peroxide, acetyl peroxide, benzoyl hydroperoxide, t-butyl perbenzoate, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decaline hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha,alpha'-azo-2-methyl butyronitrile, alpha,alpha'-2-methyl heptonitrile, 1,1'-azo-1-cyclohexane carbonitrile, dimethyl alpha,alpha'-azo-isobutyrate, 4,4'-azo-4-cyanopentanoic acid, azobisisobutyronitrile, persuccinic acid, diisopropyl peroxy dicarbonate, and the like; a mixture of initiators may also be used.

The efficiency of the initiator is conditioned upon its being sufficiently active under the polymerization conditions employed. Particular conditions affecting the initiator's efficiency are, for example, the reaction temperature (in the range from about 30° to about 150° C.), and the nature of the adduct(s) being modified, and, where a metal catalyst(s) is employed, its nature.

Although the efficiency of the initiator is acceptable when it is used alone, an organo transition metal catalyst can be added with the initiator to accelerate the reaction. The preferred metal catalyst is ferrocene. Suitable organometallic catalysts are disclosed in U.S. patent application Ser. No. 113,841, the teachings of which are hereby incorporated by reference.

The free-radical initiated reaction of this invention can be conducted under conditions known to be suitable for free-radical polymerizations, using, e.g., solution, bulk, emulsion, or suspension techniques. It has been found especially useful to carry out the reaction on the unsaturated diester and polyoxyalkylene reactants alone in the presence of the initiator and optionally the metal catalyst.

The reaction is advantageously carried out by mixing the reactants, initiator(s) and optionally metal catalyst(s) at temperatures from about 30° to about 150° C. under an inert atmosphere such as that provided by nitrogen and like inert gases until reaction is complete. The reaction is continued until consumption of the unsaturated diester ceases, as detected by conventional analytical methods, such as gel permeation chromatography. Reaction times of 1 or more hours can be expected.

The initiator(s) and optional metal catalyst(s) can be added at the beginning of the reaction or can be added portionwise at intervals during the course of reaction. Similarly, the polyoxyalkylene adduct and esterified unsaturated dibasic acid can be brought together at the beginning of the reaction or can be combined in increments as reaction proceeds, such as by the gradual addition of the diester to a resin kettle containing the adduct.

In a preferred embodiment of the invention the unsaturated diester constitutes between about 5 and 40, more preferably 10 and 30, weight percent of the reaction mixture. The unsaturated diester comprises about 20 weight percent of the reaction mixture in a most advantageous and preferred embodiment of the invention. The concentration of initiator(s) in the mixture is advantageously within the range of about 2 to 30 weight percent, preferably 4 to 25 weight percent, based on the total weight of diester(s) present. Generally, the optional metal catalyst(s) is utilized at a level of 0.001 to 0.1 grams per gram of initiator. Preferably, 0.001 to 0.06 grams of metal catalyst(s) per gram of initiator are used.

The molecular weight of the conventional polyoxyalkylene adduct to be copolymerized can vary over a wide range. However, if the molecular weight is too low, the foam prepared with the subsequently prepared copolymerization product gives coarse cells. No comparable limitation has been found in the case of conventional polyoxyalkylene adducts of high molecular weights. The latter adducts can be utilized in the highest molecular weights currently available to yield fine-celled foams in accordance with the present invention. As previously indicated, the suitable molecular weight and alkylene oxide content for any particular adduct and foam system is readily determinable by those skilled in the art. In general, the starting material alkoxylated adduct will have a molecular weight of above about 1000, and advantageously in the range of approximately 2000 to 12,000. The molecular weight can be determined from the equation:

$$M.W. = (56.1 \times 1000 \times f)/OH$$

where
M.W. = molecular weight of the polyoxyalkylene adduct,
f = functionality, that is, average number of hydroxyl groups per molecule of polyoxyalkylene adduct, and
OH = hydroxyl number of the polyoxyalkylene adduct.

In certain foam systems it is desirable that the conventional polyoxyalkylene adduct used in the present invention be treated with a suitable agent to cap its hydroxyl groups. Suitable capping agents are those organic compounds capable of reacting with compounds containing active hydrogen groups, such as hydroxyl groups, as determined by the Zerewitinoff method. The capping agents convert the hydroxyl groups of the polyoxyalkylene adduct to groups which are substantially chemically inert in the cellular foam-forming mixtures of the invention. The capping reaction takes place under conditions well known in the art; as, for example, described in Sandler, S. R. and Karow, "Organic Functional Group Preparations," Orgaic Chemistry, A Series of Monographs Edited by A. J. Blomquist, Academic Press, New York and London, 1968 Edition, pages 246–247, 1971 Edition, Vol. II, page 223 and 1972 Edition, Vol. III, page 13, the descriptions of which are incorporated herein by reference. The capping treatment may take place either before or after the copolymerization. Suitable capping agents include organic acids, acid anhydrides, acid chlorides, and acyloxy chlorides, such as a lower alkyl monocarboxylic acid having 1 to 10 carbon atoms selected from the group consisting of acetic acid, propionic acid, butyric acid, hexanoic acid, octanoic acid, decanoic acid, isomers of these acids, anhydrides of these acids, acid chloride derivatives of these acids and mixtures thereof. Acetic anhydride is readily obtainable and convenient to use. Similarly, aromatic acids, anhydrides and chlorides can be employed. Benzoyl chloride and substituted products of it such as 3,5-dinitrobenzoyl chloride are examples of these. Alkyl and aromatic isocyanates can also be employed. Other factors, such as solubility in the polyoxyalkylene adduct being treated and the solubility of the capped surfactant in whatever resin system is to be stabilized, are considerations of which a practitioner in the art is cognizant in selecting the capping system which will yield the desired closed cell stabilized foam. Examples of suitable capping agents are acetic acid, acetic anhydride, acetyl chloride and 3,5-dinitrobenzoyl chloride. The preferred capping agent is acetic anhydride. The capping treatment is typically performed at temperatures ranging from 50° to 140° C. and is advantageously carried out until the surfactant has a hydroxyl value of less than 50, and preferably less than 10. The hydroxyl number is determined by the ASTM-D 1638 test. It may be highly advantageous in certain foam systems to strip off any acid formed during the capping treatment, as, e.g., the acetic acid formed in using acetic anhydride as capping agent. The capped reaction product of the claims includes both the stripped and unstripped product.

One of the preferred surfactants of the present invention is the capped or uncapped product of the reaction of an unsaturated diester and an ethoxylated castor oil. The latter material is prepared by ethoxylating the hydroxy groups on the triester of ricinoleic acid. For purposes of the present invention, it is advantageous that the resulting ethoxylated product contains at least 25 moles of ethylene oxide per mole of castor oil. The ethylene oxide content is preferably 25 to 60, most preferably 35 to 40, moles per mole of oil.

Another preferred surfactant of the invention is the capped or uncapped product of the reaction of an alkoxylated amine having the formula:

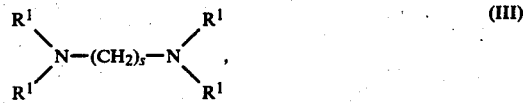

wherein $R^1$ is independently an alkoxylated chain having the formula:

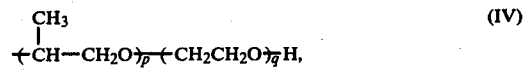

s is an integer from 2 to 10 inclusive and the ratio p:q is from 10:90 to 90:10, and an unsaturated diester. The unsaturated diester is preferably a dialkyl maleate wherein the alkyl of the maleate has 8 to 18 carbon atoms. Examples of preferred dialkyl maleates are dioctyl maleate, ditridecyl maleate and dioleyl maleate.

The alkoxylation is carried out in a known manner using a mixture of ethylene oxide and propylene oxide in the molar ratio of 10:90 to 90:10 and preferably from 40:60 to 60:40. The molecular weight of the alkoxylated amine is from 1500 to 12,000 and preferably from 2500 to 6000. If the molecular weight of the alkoxylated amine is less than 1500, foam collapse can occur.

In the reaction of the unsaturated diester with the above alkoxylated amine of formula III, the unsaturated diester advantageously comprises between 5 and 40 weight percent of the reaction mixture, and preferably 20 weight percent of the reaction mixture. The alkoxylated amine/unsaturated diester reaction product is advantageously capped by reacting it with acetic anhydride.

Instead of employing branched polyols, such as the alkoxylated amine of formula III above, as the polyoxyalkylene adduct of the invention, linear polyols may advantageously be used. Examples of such adducts are the linear polyols based on propanediols, supplied under the name "Pluronics" by BASF Wyandotte Corporation. Pluronic polyols are block copolymers of ethylene oxide and propylene oxide. One type of Pluronics consists of a central block of propylene oxide units with ethylene oxide blocks on each end. For any particular polyol series of this type, propylene oxide is added to 1,2-propanediol to attain a desired chain length and then various levels of ethylene oxide are added to achieve the desired ethylene oxide:propylene oxide ratio. Another type of Pluronic are the Pluronic R series of polyols wherein ethylene oxide is first polymerized onto 1,3-propanediol, followed by the polymerization of propylene oxide onto the resulting ethoxylated structure. The alkoxylation of the Pluronics is carried out in a known manner.

The products obtained by reacting together a polyoxyalkylene adduct and unsaturated diester in accordance with the present invention can be utilized as cellular foam stabilizing surfactants. By cellular foam stabilizing surfactants are meant those which keep the foam from collapsing and rupturing. Surfactants obtained in accordance with this invention are found to be especially useful cell stabilizers in phenolic, isocyanurate and urethane foams. They have the capability of giving fine-celled, low k-factor foams.

The surfactant of the invention is employed in a cell stabilizing amount in the foam-forming composition of the invention. Generally, the surfactant comprises from 0.05 to 10, and preferably comprises from 0.1 to 6, weight percent of the composition. Too little surfactant fails to stabilize the foam and too much surfactant is wasteful. Those surfactants which are non-ionic are particularly good cell stabilizers. In certain foam systems, e.g., involving polyisocyanurate and phenolic polymers, the capped polyol is preferred.

The surfactant of the present invention is particularly useful in the production of a closed-cell cellular composition comprising a phenolic resin and blowing agent in addition to the surfactant. Phenolic resin foams are a well-known class, phenol-aldehyde resin foams being representative and proportions of blowing agent and catalyst components being well known in the art.

Foams of low friability can be obtained by using a preferred phenolic polymer described in Moss U.S. Pat. No. 3,876,620, the disclosure of which is incorporated herein by reference. The preferred phenolic polymer is an alkylol group containing phenolic polymer of the formula:

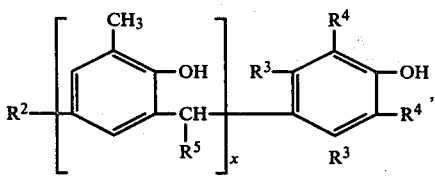

wherein $R^2$ is

hydrogen or a radical of the formula:

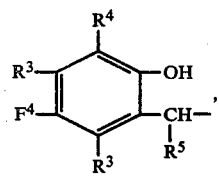

The $R^3$'s are independently selected from the group consisting of lower alkyl, preferably of 1 to 4 carbon atoms, phenyl, benzyl, halo, preferably chloro, bromo, or fluoro, nitro, and hydrogen. The $R^4$'s are independently selected from the group consisting of

hydrogen, or a radical of above Formula VI.

The $R^5$'s are independently selected from the group consisting of lower alkyl, preferably of 1 to 4 carbon atoms, hydrogen, phenyl, benzyl, or furyl. By furyl is meant the radical introduced by the use of furfural. In above Formula V, x is an integer from 2 to 10 inclusive and is preferably an integer from 2 to 6 inclusive. When x is less than 2, a foam produced from such a phenolic polymer tends to have too high a friability. On the other hand, as x exceeds 10, the viscosity of the polymer increases to the point where it is difficult to process the foam. The phenolic polymers of the present invention generally have a molecular weight between 300 and 2,000. At lower molecular weights, the resultant foams tend to have too high a friability, whereas at high molecular weights the viscosity of the phenolic polymer, even when a solvent is present, tends to be too high to permit processing.

A preferred subclass of phenolic polymers are those of the formula:

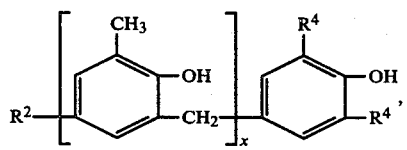

wherein $R^2$ is $HOCH_2$—, hydrogen or a radical of the formula:

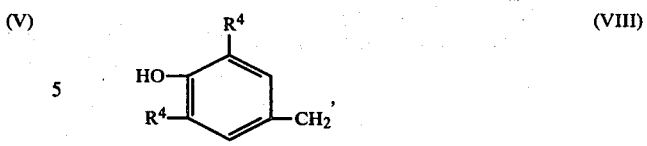

The $R^4$'s in above Formulas VII and VIII are independently selected from the group consisting of $HOCH_2$—, hydrogen or a radical of above Formula VIII.

In a preferred embodiment of the present invention, at least one of the $R^4$'s is methylol, i.e, $HOCH_2$—. This is to ensure that there will be cross-linking sites on the phenolic polymer. Of course, it is well known in the art that such methylol groups or, when the aldehyde is other than formaldehyde, alkylol groups, are automatically introduced into the polymer by the process described below.

In the broadest aspects of the present invention, the phenolic polymer can contain widely varying ratios of the radicals of Formula VI or VIII to ortho-cresol units. However, this ratio is generally from 1:3 to 10:1 and is preferably from 1:1 to 4:1. At higher ratios, i.e., a deficiency of ortho-cresol, the cellular material produced from such a phenolic polymer tends to be too friable. In determining the above ratios, one must include the radicals of Formula VI or VIII present in Formula V or VII, respectively. The phenolic polymers of the invention can be synthesized by the methods described in U.S. Pat. No. 3,876,620.

The phenolic compositions useful in the present invention generally comprise the phenolic polymer of Formula V or Formula VII, together with a compound of the formula:

wherein the $R^3$'s are independently selected from the group consisting of lower alkyl, preferably of 1 to 4 carbon atoms, phenyl, benzyl, halo, preferably chloro, bromo, or fluoro, nitro, and hydrogen.

The compound of Formula IX can be present in the phenolic composition in widely varying ratios of Compound IX to the polymeric composition but is generally present in a weight ratio of 1:30 to 1:2 and is preferably present in a weight ratio of 1:20 to 1:5. Examples of suitable compounds of Formula IX include among others: m-cresol, m-chlorophenol, m-nitrophenol, 3,5-xylenol, and phenol, i.e., hydroxy benzene. Phenol is the most preferred compound of Formula IX because of cost, availability, and reactivity. The phenolic polymers of Formula V and Formula VII are produced according to the present invention by combining the reactants in a two-step process described in Moss, U.S. Pat. No. 3,876,620.

In the broadest aspects of the present invention, any aldehyde can be employed to produce useful phenolic polymers. Examples of suitable aldehydes include, among others, furfural, formaldehyde, benzaldehyde, and acetaldehyde. Formaldehyde is the preferred aldehyde. Formaldehyde can be employed in widely varying forms such as the 37% aqueous solution widely known as formalin. However, it is generally necessary to remove from the polymeric material the water introduced with the formalin. Formaldehyde is preferably employed in the form of paraformaldehyde which contains much less water.

The cellular material of the present invention is formed by simply reacting the alkylol group containing phenolic polymer of Formula V or Formula VII and the compound of Formula IX under conditions such that a cellular product will result. As is well known in the phenolic foam art, the reaction can be conducted in the presence of a foaming catalyst, a blowing agent, and a surfactant. The reaction can be performed between temperatures of 10°–50° C., preferably 15°–25° C., and conveniently at atmospheric pressure. The cellular materials of the present invention generally have a thermal conductivity k-factor value of from 0.1 to 0.3, and preferably from 0.1 to 0.2 Btu/hr-°F.-sq. ft. per inch as measured at 24° C. The k-factor value is measured on a Model 88 machine supplied by the ANACON Company. The friability of the cellular material is 20% or less. Friability is the propensity of the foam to break expressed in percent weight loss. This is determined by the ASTM C-421 friability test conducted for 10 minutes.

In the broadest aspects of the present invention, any catalyst which will enhance the cross-linking and foaming reaction of the phenolic foam forming mixture can be employed in the present invention. However, the preferred foaming catalysts are aromatic sulfonic acids, examples of which include, among others, benzene sulfonic acid, toluene sulfonic acid, xylene sulfonic acid, and phenol sulfonic acid. Phosphoric acid can also be employed either alone or in admixture with the sulfonic acids. The preferred sulfonic acid is a mixture of equal parts by weight of toluene sulfonic acid and xylene sulfonic acid, as described in Mausner et al. U.S. Pat. No. 3,458,449. Another foaming catalyst which has been found to give excellent results in a blend of toluene sulfonic acid, phosphoric acid, and water in a weight ratio of 35-50:50-35:15.

The catalyst is generally present in the minimum amount that will give the desired cream times of 10 to 120 seconds and firm times of 40 to 600 seconds to the reacting mixture. The catalyst, however, generally comprises from 0.5 to 20, and preferably comprises from 1.0 to 15, weight percent, based on the weight of the cellular material.

Any blowing agent characteristically employed in similar prior art products, such as is described in Moss et al., U.S. Pat. No. 3,968,300, can be employed in the phenolic foam forming composition of the present invention. In general, these blowing agents are liquids having an atmospheric pressure boiling point between minus 50° and 100° C. and preferably between zero and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Combinations of trichlorofluoromethane plus 1,1,2-trichloro-1,2,2-trifluoroethane, are the preferred blowing agents. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

The cellular phenolic product formed by using the surfactant of the invention has a uniform, fine-celled structure. Uniformity of cells is determined by visual and microscopic examination. This property of producing a fine-celled foam is tested by mixing 2 to 5% of the surfactant with the phenolic composition and producing a foam as described herein.

The average cell size diameter should ideally be less than 0.2 mm and is more preferably less than 0.1 mm (ASTM D-2842). Fine-celled foams can by the means set forth in the invention be rendered closed cells. The blowing agent is then trapped in the cells. One means of expressing the containment in the cells of the blowing agent is by use of the k-factor drift value. Unfaced cellular materials containing fluorocarbon gas have initial k-factors in the vicinity of 0.1–0.2 at 24° C. This low value increases over a period of months or sometimes days. The change is expressed as the k-factor drift. The k-factor is measured at a mean temperature of 24° C. The value is redetermined at various time intervals up to about 1000 days. A material exhibiting fast k-drift will attain a k-factor (BTU/hr-°F.-ft$^2$ per inch thickness) of at least 0.2 within 25 days. A slow k-drift material may require between 200 days and over two years to attain a 0.2 value. Any material which possesses a k-value under 0.2 will provide high thermal resistance. Obviously, the longer this value or a lower value is maintained, the better the efficiency.

Ball, Hurd, and Walker have published a comprehensive discussion of k-factor changes as a function of time. ("The Thermal Conductivity of Rigid Urethane Foams", J. Cellular Plastics, March/April, 1970, pp 66–78). F. Norton ("Thermal Conductivity and Life of Polymer Foams", J. Cellular Plastics, January, 1967, pp 23–37) has shown that diffusion of fluorocarbon gases out of unfaced foam and infusion of air into the foam causes an increase in k-factor. A slow k-drift foam is defined as one that attains a k-factor at 24° C. of 0.15–0.17 after 200–400 days and then remains below 0.2 k-factor for 5–10 years. Eventually all fluorocarbon diffuses from the foam to leave a closed cell material which contains only air in the cells.

The k-factor for the closed cell foam containing only air falls in the range of 0.22–0.26 BTU/hr-°F.-ft$^2$ per inch thickness at 24° C. for the 2–3 lbs/ft$^3$ density range. Therefore, if a foam exhibits greater than 0.2 k-factor after a short period of time (less than 25 days), then substantially all fluorocarbon has diffused from the foam and has been replaced by air. On the other hand, if the k-factor remains below 0.2 for at least 100 days, then a substantial amount of fluorocarbon gas remains in the closed cells of the foam in spite of infusion of air.

It has been found that use of surfactants of the invention results in fine-celled phenolic foams with a high closed cell content, a low initial k-factor and a low k drift value.

Surfactants of the present invention are also useful in the preparation of polyisocyanurate foams and polyurethane foams. The surfactant generally comprises from 0.05 to 4, and preferably comprises from 0.1 to 2, weight percent of the foam-forming composition.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenylmethane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylenepolyphenyl isocyanates. These isocyanates are prepared by conventional methods known in the art such as the phosgenation of the corresponding organic amine.

The polyols which can be employed in the preparation of the polyurethane foam compositions include, for example, monomeric polyols, such as ethylene glycol, the oxyalkylene adducts of polyol bases wherein the oxyalkylene portion is derived from a monomeric unit such as ethylene oxide, propylene oxide, butylene oxide and mixtures thereof. The polyol initiators include ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, sucrose, toluene diamine and bisphenol A, polyethers such as polyethylene ether glycols, polypropylene ether glycols, polytetramethylene ether glycols, and alkylene oxide adducts of polyhydric alcohols including those listed above; hydroxy terminated tertiary amines of the formula:

wherein $R^6$ is an alkylene radical containing at least 2 to 6 carbon atoms and E is a polyoxyalkylene chain; amine based polyethers of the formula:

wherein E is a polyoxyalkylene chain and Y is selected from the group consisting of alkyl, hydroxyalkyl and EH; alkylene oxide adducts of acids of phosphorus such as the adducts prepared by the reaction of phosphoric acid and ethylene oxide, phosphoric acid and propylene oxide, phosphorus acid and propylene oxide, phosphonic acid and ethylene oxide, phosphinic acid and butylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and poly-1,4-oxybutylene and polyoxyethylene glycols, and random copolymer glycols prepared from blends or sequential addition of two or more alkylene oxides. Also adducts of the above with trimethylolpropane, glycerine and hexanetriol as well as the polyoxypropylene adducts of higher polyols such as pentaerythritol and sorbitol may be employed. Thus, the polyether polyols which can be employed in the present invention include oxyalkylene polymers which have an oxygen/carbon ratio from about 1:2 to 1:4 and preferably an oxygen carbon atom ratio from about 1:2.8 to 1:4 and from about 2 to 6 terminal hydroxyl groups, preferably about 2 to 4 terminal hydroxyl groups. The polyether polyols generally have an average equivalent weight from about 80 to 10,000 and preferably have an average equivalent weight from about 100 to about 6000. Polyoxypropylene glycols having molecular weights from about 200 to about 4000 corresponding to equivalent weights from about 100 to 2000 and mixtures thereof are particularly useful as polyol reactants. Polyol blends such as a mixture of high molecular weight polyether polyols with lower molecular weight polyether polyols or monomeric polyols can also be employed.

Any suitable hydroxy terminated polyester may also be used. These can be obtained from the reaction of polycarboxylic acids and polyhydric alcohols. Such suitable polycarboxylic acids may be oxalic acid, malonic acid, succinic acid, glutaric acid, adipic acid, pimelic acid, suberic acid, azelaic acid, sebacic acid, basilic acid, thapsic acid, maleic acid, fumaric acid, glutaconic acid, isophthalic acid and terephthalic acid. Suitable polyhydric alcohols include the following: ethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,4-hexanediol, glycerol, trimethylolpropane, trimethylolethane, hexane 1,2,6-triol, α-methylglucoside, pentaerythritol, sorbitol, sucrose, and compounds derived from phenols such as 2,2-bis(4-hydroxyphenol) propane.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The polyurethane foams are prepared by reacting the polyol and polyisocyanate on an essentially 1:1 to 1:1.2 equivalent basis. The organic polyisocyanate is mixed together with the desired polyol, surfactant, catalyst and blowing agent at temperatures ranging from about 0° C. to 150° C.

Any blowing agent typically employed in similar prior art foam products containing polyisocyanurate and/or polyurethane linkages can be employed in the compositions of the present invention. In general, these blowing agents are liquids having a boiling point between minus 50° C. and plus 100° C. and preferably between 0° C. and 50° C. The blowing agents and amounts thereof described above as useful in connection with the phenolic foams may also be utilized in the polyisocyanurate and polyurethane foams.

Suitable catalysts for the foam preparations include dibutyltin dilaurate, dibutyltin diacetate, stannous octoate, lead octoate, and cobalt naphthenate. The catalysts generally comprise from 0.1 to 20 and preferably from 0.3 to 10, weight percent of the total composition.

Other additives may also be included in the foam formulations. Included are flame retardants, such as tris(2-chloroethyl)-phosphate, and additional surfactants, such as the silicone surfactants, e.g., alkylpolysiloxanes and polyalkylsiloxanes. Examples of such additional surfactants are the polydimethylsiloxane-polyoxyalkylene block copolymers available from the Union Carbide Corporation under the tradenames "L-5420" and "L-5340" and from the Dow Corning Corporation under the tradename "DC-193."

In a preferred rigid foam of the invention containing polyisocyanurate linkages, the organic polyisocyanate is polymethylene polyphenylisocyanate. The polymethylene polyphenylisocyanates desirably have a functionality of at least 2.1 and preferably 2.5 to 3.8. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention are a mixture of those of Formula XII:

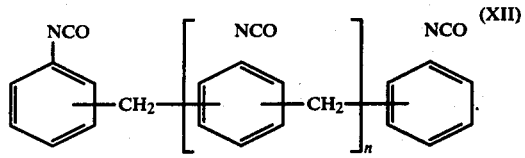

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of Formula XII, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843 filed Jan. 11, 1973 now abandoned. The synthesis of polymethylene polyphenylisocyanates is described in Seeger et al., U.S. Pat. No. 2,683,730 and in Powers U.S. Pat. No. 3,526,652 at Column 3, Lines 6–21. It should, therefore, be understood that the polymethylene polyphenylisocyanate available on the market under the tradenames of PAPI-20 (Upjohn) and E-418 (Mobay) can successfully be employed within the spirit and scope of the present invention.

In the broadest aspects of the present invention, any diol having a low equivalent weight, which is generally between 30 and 100, and preferably between 30 and 70, and having two hydroxyl groups which pass the Zerewitinoff Test, can be employed to react with the polymethylene polyphenylisocyanates described in the three immediately preceding paragraphs to produce preferred rigid foams of the invention. Triols and higher polyols can be admixed with these diols in minor amounts generally less than 40 percent provided the equivalent weight of the mixture is within the specified range. The preferred diols are those of Formula XIII:

$$\text{HO}-\text{R}^7-\text{OH} \tag{XIII}$$

wherein $R^7$ is selected from the group consisting of lower alkylene and lower alkoxyalkylene with at least two carbon atoms. Examples of suitable diols include, among others, ethylene glycol, 1,2-propanediol, 1,3-propanediol, 1,4-butanediol, diethylene glycol, dipropylene glycol, dimethylol dicyclopentadiene, 1,3-cyclohexanediol, and 1,4-cyclohexanediol. Diethylene glycol is preferred since it gives a core of minimum friability and optimum facer sheet adhesion.

In order to ensure complete reaction, the polymethylene polyphenylisocyanate and the diol are generally mixed in an equivalent ratio of 2:1 to 6:1 and preferably 3:1 to 5:1. In ranges outside these proportions the reaction yields a product having undesirable physical characteristics. At higher ratios the product has an undesirably high friability. At lower ratios the product has an undesirably high flammability.

In the preparation of these rigid foams, any catalysts known to catalyze the trimerization of isocyanates to form isocyanurates can be employed as long as they give cream times of 15 to 30 seconds and firm times of 25 to 60 seconds. One preferred type of catalyst is a mixture of equivalent amounts of 2,4,6-tris(dimethylaminomethyl)phenol and potassium-2-ethyl hexoate, the synthesis and use of which is described in U.S. Pat. No. 4,169,921, issued Oct. 2, 1979. Another catalyst system is that employing an epoxide, an N-substituted aziridine, and a tertiary amine. The synthesis and use of such a catalyst is described in U.S. application Ser. No. 251,279 filed May 8, 1972, now U.S. Pat. No. 3,799,896.

Referring now to the drawings, and in particular to FIG. 1, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In operation, the isocyanate tank 11 is charged with the organic polyisocyanate admixed with the blowing agent and the surfactant, and the polyol tank 12 is charged with the polyol, and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. Alternatively, lines 21 and 22 can be combined prior to the mixing head. The pull rolls 38, 39 each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol, the diol, and the isocyanate in the presence of the catalyst. The temperature within the oven is controlled by varying the temperature of the hot air from vents 36, 36', in order to insure that the temperature within the oven 35 is maintained within the herein described limits. The composite structure 55 then leaves the oven 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

Figure 3:
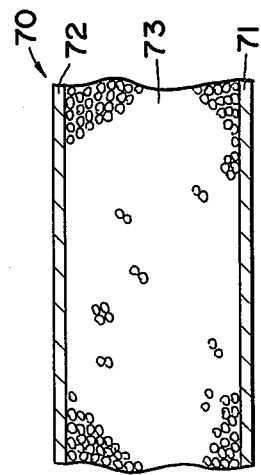
FIG. 3 is a cross-sectional view of a laminated building panel having two facing sheets.
Figure 2:
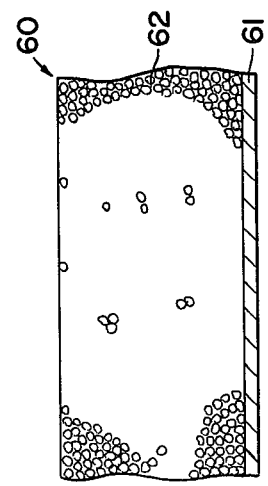
FIG. 2 is a cross-sectional view of a laminated building panel having one facing sheet.

Referring to FIG. 2 of the drawings, there is shown a laminated building panel 60 of the invention. The building panel 60 comprises a single facing sheet 61 having thereon a cellular material 62 of the present invention. FIG. 3 shows a building panel 70 having two facing sheets 71 and 72 on either side of a cellular material 73.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. No. 4,118,533, the disclosure of which is hereby incorporated by reference.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

Preparation of Dipentyl Maleate, Dihexyl Maleate and Dioleyl Maleate

Dipentyl maleate (DPM), dihexyl maleate (DHM), and dioleyl maleate (DOLM) were prepared according to a procedure given in the literature.* To a 1 liter, 3-necked round bottom flask equipped with an overhead stirrer and a Dean Stark trap were added 350 ml of benzene, maleic anhydride (87 g), the alcohol (1.65 moles of either pentanol, hexanol, or oleyl alcohol) and p-toluene sulfonic acid (1.2 g). The mixture was heated to reflux, under nitrogen, until water was no longer collected (~17 ml water collected or approximately 75% conversion). The solvent, water and excess alcohol were removed in vacuo. The residue was dissolved in ethyl acetate or dichloromethane and extracted with water (~300 ml), 5% NaHCO$_3$ (~300 ml), dried over MgSO$_4$, filtered and the solvent evaporated in vacuo.

*Misra, A. K., Mehratra, A. K., Srivastova, K. D. and Nand, A. N., Journal of the Institute of Petroleum 59, 290 [1973].

DPM was obtained in approximately 70% yield.
Calculated analysis for C$_{14}$H$_{24}$O$_4$: C, 65.60; H, 9.44. Found: C, 65.54; H, 9.31.

DHM was obtained in 72% yield.
Calculated analysis for C$_{16}$H$_{24}$O$_4$: C, 67.57; H, 9.92. Found: C, 67.09; H, 9.50.

DOLM was obtained in 70% yield.
Calculated analysis for C$_{40}$H$_{72}$O$_4$: C, 77.86; H, 11.76. Found: C, 78.41; H, 11.96.

EXAMPLE 2

Preparation of Tetronic Polyol-Maleate Diester Surfactants

This example illustrates the preparation of various Tetronic polyol-maleate diester surfactants.

To a 500 ml resin kettle equipped with an overhead stirrer were added 200 g of ethoxylated propoxylated ethylene diamine (Tetronic 704) and 0.33 g of ferrocene. A nitrogen stream was provided through the resin kettle. A solution containing 6 g of tert.-butyl perbenzoate dissolved in 34 g of dibutyl maleate was added slowly over two hours to the polyol from an addition funnel. During the addition, the reaction mixture was maintained at 100° C. After the addition, the temperature of the reaction mixture was increased to 140° C. for one hour and then allowed to cool to room temperature. Acetic anhydride (17 g) was next added to the reaction mixture. This addition corresponds to the amount of acetic anhydride needed to cap the polyol, as determined from the polyol hydroxyl number. The mixture was heated to 100° C. for two hours and then cooled to room temperature to produce a polyol-maleate diester surfactant in the form of a viscous liquid (Surfactant No. 1 of Table I below). (The acetic anhydride caps the hydroxyl end groups of the polyol with acetate groups.) Residual dibutyl maleate, according to GLC, was 1.4% (90% conversion).

The above alkoxylated diamine used in the preparation of Surfactant No. 1 has a molecular weight of 5500, has a weight ratio of ethylene oxide to propylene oxide of 40:60, and is available from the BASF Wyandotte Corporation, Wyandotte, Mich., U.S.A., under the tradename "TETRONIC 704."

Surfactant Nos. 2-7 of Table I below were prepared in a similar manner employing Tetronic 704 (200 g), ferrocene and tert.-butyl perbenzoate at the same level, i.e., 0.13 phr and 2.4 phr, respectively, and the maleate diesters listed in the table in the amounts designated therein.

TABLE I

TETRONIC 704-MALEATE DIESTER SURFACTANTS

| SURFACTANT | | DIESTER | |
|---|---|---|---|
| No. | Physical Form | UTILIZED Name | Weight (g) |
| 1 | liquid | Dibutyl Maleate | 34 |
| 2 | liquid | Dipentyl Maleate* | 34 |
| 3 | liquid | Dihexyl Maleate* | 34 |

TABLE I-continued

| TETRONIC 704-MALEATE DIESTER SURFACTANTS | | | |
|---|---|---|---|
| SURFACTANT | | DIESTER | |
| No. | Physical Form | UTILIZED Name | Weight (g) |
| 4 | liquid | Dioctyl Maleate | 34 |
| 5 | liquid | Dioctyl Maleate | 50 |
| 6 | liquid | Ditridecyl Maleate | 34 |
| 7 | liquid | Ditridecyl Maleate | 50 |

*Dipentyl and dihexyl maleates were prepared according to the procedure of Example 1.

EXAMPLE 3

This example illustrates the synthesis of a phenolic polymer useful in the present invention employing a molar ratio of phenol to o-cresol of 2:1.

The following quantities of the following ingredients were combined as indicated.

| Item | Ingredient | Amount grams | moles |
|---|---|---|---|
| A | o-cresol | 10,580 | 98 |
| B | paraformaldehyde (93.6%) | 4,743 | 148 |
| C | sodium hydroxide (50%) | 295 | 3.69 |
| D | phenol | 18,428 | 196 |
| E | paraformaldehyde (93.6%) | 7,917 | 247 |
| F | glacial acetic acid | 225 | 3.75 |

Items A and B are charged to a reaction vessel. Item C is added over a period of fifteen minutes, the temperature rises to 100° C. due to an exothermic reaction and is maintained at that level for 1.5 hours. Items D and E are then added and the temperature maintained at 80° C. for four and one-half hours. Item F is then added and the contents of the reaction are termed Resin B.

Resin B has a viscosity at 25° C. of 16,500 cps, a free phenol content of 9%, and a free water content of 8.5%, a free formaldehyde content of 0.5%, and a free o-cresol content of less than 0.1%.

EXAMPLE 4

This example illustrates the synthesis of a foaming catalyst useful in the present invention.

The following quantities of the following ingredients are combined as indicated to produce Catalyst A:

| Ingredients | | Quantity |
|---|---|---|
| Item | Name | grams |
| A | Ultra TX | 667 |
| B | water | 333 |

Items A and B are mixed. The resultant composition is termed Catalyst A. Ultra TX is a mixture of equal parts by weight of p-toluene sulfonic acid and xylene sulfonic acids available from the Witco Chemical Company.

EXAMPLE 5

This example illustrates the synthesis of phenolic foams based on 2:1 phenol:o-cresol resoles utilizing as surfactant the polyol-maleate diester products of Example 2.

In each foam synthesis, the following quantities of the following ingredients were combined as indicated:

| Item | Ingredient | grams |
|---|---|---|
| A | Resin B of Example 3 | 300 |
| B | CFCl$_3$ | 22.5 |
| C | CCl$_2$FCF$_2$Cl | 22.5 |
| D | Surfactant (See below) | 15 |
| E | Catalyst A of Example 4 | 40 |

Items A through E were mixed at 15° C. in an open vessel for 15 seconds. The mixture was then poured into a square paper box twelve inches by twelve inches by five inches tall. A foaming reaction ensued. After a period of about 240–300 seconds the material was rigid. The box and contents were placed in an oven at 55° to 75° C. for a period of ten minutes to one hour.

The characteristics of the phenolic foams synthesized in accordance with the above procedure are shown in the following Table II.

TABLE II

| | | | FOAM EVALUATION OF SURFACTANTS | | | | |
|---|---|---|---|---|---|---|---|
| PHENOLIC FOAM | SURFACTANT NO.[a] (Maleate Diester)[b] | DENSITY pcf | FRIABILITY % wt. loss, 10 min. | K-FACTOR[c] AFTER | | | CELL QUALITY |
| | | | | 1 day | 7 days | 14 days | |
| A | 1 (Dibutyl Maleate) | | high | .263 | | | Very coarse-celled |
| B | 2 (Dipentyl Maleate) | 1.9 | 39 | .237 | | | Coarse-celled |
| | | | | .198 | | | |
| | | | | .249 | | | |
| C | 3 (Dihexyl Maleate) | 1.56 | 25 | .219 | | | Slightly coarse-celled |
| | | | | .300 | | | |
| D | 4 (Dioctyl Maleate) | 2.3 | 12 | .117 | .124 | .121 | Fine-celled |
| | | | | .120 | .120 | .122 | |
| E | 5 (Dioctyl Maleate) | 2.6 | 11 | .119 | .124 | .122 | Fine-celled |
| | | | | .121 | .129 | .133 | |
| F | 6 (Ditridecyl Maleate) | 2.9 | 8 | .123 | .121 | .124 | Fine-celled |
| G | 7 (Ditridecyl Maleate) | 2.35 | 11 | .121 | .122 | .122 | Fine-celled |
| | | | | .121 | .124 | .129 | |

[a]Of Example 2.
[b]Maleate diester used in preparing the surfactant.
[c]Units = Btu-in/hr-ft$^2$-°F.

The Table II results show that the quality of the phenolic foam improves with an increase in the size of the hydrocarbon group on the maleate diester used in preparing the foam surfactant. Comparison of the properties of Foam C with those of Foams D and E reveals a particularly significant improvement when the hydrocarbon group increases from hexyl to octyl.

EXAMPLE 6

Preparation of Pluronic Polyol-Maleate Diester Surfactants

This example illustrates the synthesis of surfactants from maleate diesters and "Pluronic" polyols (available from BASF Wyandotte Corporation).

A. Molecular Weight and Ethylene Oxide Content of Pluronics

The molecular weight and ethylene oxide content of the Pluronic polyols utilized in the preparation of the surfactants of this example are shown in the following Table III. For comparison, the molecular weight and ethylene oxide content of the Tetronic 704 adduct employed in Example 2 are also shown in Table III.

TABLE III
MOLECULAR WEIGHT AND ETHYLENE OXIDE CONTENT OF PLURONICS

| POLYOL UTILIZED | MOLECULAR WEIGHT | WEIGHT % ETHYLENE OXIDE |
| --- | --- | --- |
| Pluronic L31 | 1100 | 10 |
| Pluronic L35 | 1900 | 50 |
| Pluronic L42 | 1630 | 20 |
| Pluronic L43 | 1850 | 30 |
| Pluronic L44 | 2200 | 40 |
| Pluronic L63 | 2650 | 30 |
| Pluronic L64 | 2900 | 40 |
| Pluronic P65 | 3400 | 50 |
| Pluronic F68 | 8350 | 80 |
| Pluronic L72 | 2750 | 20 |
| Pluronic P84 | 4200 | 40 |
| Pluronic P85 | 4600 | 50 |
| Pluronic F87 | 7700 | 70 |
| Pluronic P104 | 5850 | 40 |
| Pluronic L121 | 4400 | 10 |
| Pluronic L122 | 5000 | 20 |
| Pluronic P123 | 5750 | 30 |
| Tetronic 704 | 5500 | 40 |

The letters L, P, and F before the numbers in the designation of each Pluronic polyol of Table III represent the physical form of the polyol: liquid, paste or flaky solid. The last digit of the numbers represents the approximate weight percent of ethylene oxide contained in the polyol divided by 10.

B. Method of Preparation of Surfactants

A 500 ml resin kettle equipped with an overhead stirrer was charged with a mixture of 200 g of Pluronic L31 (listed in Table III above) and 0.33 g of ferrocene. While stirring the mixture under nitrogen at a temperature of 90° C., 34 g of dioctyl maleate were added from an addition funnel over two hours. 6 g of tert.-butyl perbenzoate was dissolved in the dioctyl maleate prior to the addition. Following the addition, the temperature was increased to 140° C. for one hour. The mixture was then cooled to room temperature and the appropriate amount of acetic anhydride (determined from the polyol's hydroxyl number) was added to cap the polyol. The temperature was next increased to 100° C. for one hour, after which the surfactant product was cooled to room temperature to yield a viscous liquid product (Surfactant No. 8 of Table IV below).

Surfactant Nos. 9–34 of Table IV below were each prepared in a similar manner employing the Pluronic polyol (200 g) listed in the table, ferrocene and tert.-butyl perbenzoate at the same level, i.e., 0.13 phr and 2.4 phr, respectively, and the maleate diester listed in the table in the amount designated therein.

TABLE IV
PLURONIC-MALEATE DIESTER SURFACTANTS

| SURFACTANT | | | DIESTER UTILIZED | |
| --- | --- | --- | --- | --- |
| No. | Physical Form | PLURONIC POLYOL UTILIZED | Name | Weight (g) |
| 8 | viscous liquid | Pluronic L31 | Dioctyl Maleate | 34 |
| 9 | viscous liquid | Pluronic L35 | Dioctyl Maleate | 34 |
| 10 | viscous liquid | Pluronic L42 | Dioctyl Maleate | 34 |
| 11 | viscous liquid | Pluronic L43 | Dioctyl Maleate | 34 |
| 12 | viscous liquid | Pluronic L44 | Dioctyl Maleate | 34 |
| 13 | viscous liquid | Pluronic L63 | Dioctyl Maleate | 34 |
| 14 | viscous liquid | Pluronic L64 | Dioctyl Maleate | 34 |
| 15 | viscous liquid | Pluronic L64 | Dioctyl Maleate | 50 |
| 16 | paste | Pluronic P65 | Dioctyl Maleate | 50 |
| 17 | paste | Pluronic F68 | Dioctyl Maleate | 50 |
| 18 | viscous liquid | Pluronic L72 | Dioctyl Maleate | 50 |
| 19 | paste | Pluronic P84 | Dioctyl Maleate | 50 |
| 20 | paste | Pluronic P85 | Dioctyl Maleate | 50 |
| 21 | paste | Pluronic F87 | Dioctyl Maleate | 50 |
| 22 | paste | Pluronic P104 | Dioctyl Maleate | 34 |
| 23 | viscous liquid | Pluronic L121 | Dioctyl Maleate | 34 |
| 24 | viscous liquid | Pluronic L122 | Dioctyl Maleate | 50 |
| 25 | paste | Pluronic P123 | Dioctyl Maleate | 50 |
| 26 | viscous liquid | Pluronic L44 | Ditridecyl Maleate | 34 |
| 27 | viscous liquid | Pluronic L63 | Ditridecyl Maleate | 34 |
| 28 | viscous liquid | Pluronic L64 | Ditridecyl Maleate | 34 |
| 29 | viscous liquid | Pluronic L64 | Ditridecyl Maleate | 50 |
| 30 | paste | Pluronic P65 | Ditridecyl Maleate | 50 |
| 31 | paste | Pluronic F68 | Ditridecyl Maleate | 50 |
| 32 | paste | Pluronic P84 | Ditridecyl Maleate | 50 |
| 33 | paste | Pluronic P85 | Ditridecyl Maleate | 50 |
| 34 | paste | Pluronic P123 | Ditridecyl Maleate | 50 |

EXAMPLE 7

This example illustrates the synthesis of phenolic foams based on 2:1 phenol:o-cresol resoles utilizing as surfactant various polyol-maleate diester products of Example 6.

Each foam synthesis was performed according to the procedure of Example 5 utilizing the ingredients and amounts of the same described in said example, but replacing the surfactants of Example 5 by the surfactants listed in Table V below. As in Example 5, 15 g of surfactant were employed in each foam synthesis. The characteristics of the phenolic foams produced are shown in the following Table V.

TABLE V

FOAM EVALUATION OF SURFACTANTS

| PHENOLIC FOAM | SURFACTANT NO.[a] | DENSITY pcf | FRIABILITY % wt. loss, 10 min. | K-FACTOR[b] AFTER | | | | CELL QUALITY |
|---|---|---|---|---|---|---|---|---|
| | | | | 1 day | 7 days | 14 days | 28 days | |
| A | 12 | 2.20 | 13 | .138 .130 | .204 .145 | | | fine-celled |
| B | 13 | 2.45 | 12 | .119 .122 | .175 .161 | .192 .182 | | fine-celled |
| C | 14 | 2.45 | 12 | .123 .122 | .136 .173 | .142 .192 | | fine-celled |
| D | 15 | 2.10 | 13 | .150 .162 | .225 .222 | | | fine-celled |
| E | 16 | 2.40 | 12 | .116 .117 | .153 .152 | .171 .170 | | fine-celled |
| F | 17 | 1.65 | 9 | .119 .120 | .126 | .113 | .114 | fine-celled |
| G | 19 | 2.31 | 11 | .115 .121 | .119 .114 | .115 .119 | .112 .121 | fine-celled |
| H | 20 | 2.7 | 13 | .112 .117 | .113 .121 | .115 .124 | .116 .123 | fine-celled |
| I | 25 | 2.58 | 13 | .116 .114 | .139 .118 | .154 .121 | .173 | fine-celled |
| J | 26 | 2.20 | 12 | .142 .157 | .222 .189 | | | fine-celled |
| K | 27 | 2.70 | 14 | .120 .130 | .138 .142 | .147 .142 | | fine-celled |
| L | 28 | 2.60 | 13 | .123 .120 | .133 .129 | .134 .133 | | fine-celled |
| M | 29 | 2.60 | 13 | .119 .122 | .123 .144 | .127 .161 | | fine-celled |
| N | 30 | 2.68 | 12 | .117 .117 | .125 .124 | .125 .123 | | fine-celled |
| O | 31 | 2.56 | 11 | .114 .114 | .119 .121 | .116 .122 | | fine-celled |
| P | 32 | 1.8 | 14 | .118 | .128 | .131 | .137 | fine-celled |
| Q | 33 | 1.95 | 13 | .119 .122 | .126 .129 | .121 .136 | | fine-celled |
| R | 34 | 1.84 | 13 | .120 | .128 | .130 | | fine-celled |

[a]Of Example 6. Dioctyl maleate was used in preparing Surfactant Nos. 12 to 25, and ditridecyl maleate was used in preparing Surfactant Nos. 26 to 34.
[b]Units = Btu-in/hr-ft$^2$-°F.

The Table V results show that of those phenolic foams made with the Pluronic polyol-dioctyl maleate surfactants, the best quality foams were obtained utilizing surfactants wherein the molecular weight of the Pluronic polyol was 4200 (Surfactant No. 19 made with Pluronic P84) or more. The results also show that the Pluronic polyol-ditridecyl maleate surfactants as a group surpassed the Pluronic-dioctyl maleate surfactants in phenolic foam stabilization capacity.

EXAMPLE 8

This example illustrates the synthesis of a phenolic polymer useful in the present invention employing a molar ratio of phenol to ortho cresol of 4:1.

The following quantities of the following ingredients were combined as indicated.

| Item | Ingredient | Amount grams | moles |
|---|---|---|---|
| A | o-cresol | 6,901 | 63.9 |
| B | paraformaldehyde (93.5% HCHO) | 3,133 | 97.7 |
| C | sodium hydroxide (50% NaOH) | 215 | 2.69 |
| D | phenol | 24,025 | 255.5 |
| E | paraformaldehyde (93.5% HCHO) | 11,350 | 354.1 |
| F | sodium hydroxide (50% NaOH) | 215 | 2.69 |
| G | glacial acetic acid | 350 | 5.8 |

Items A and B were charged to a reaction vessel. Item C was added over a period of fifteen minutes, the temperature rose due to the exothermic reaction to 100° C. and was maintained at that level for 1.5 hours. Items D, E, and F are then added and the temperature maintained at 80° C. for 5 hours. Item G was then added and the contents of the reaction vessel are termed Resin C.

Resin C has a viscosity at 25° C. of 22,000 cps, a free phenol content of 9%, and a free water content of 10.9%, a free formaldehyde content of 1.1%, and a free o-cresol content of less than 0.1%.

EXAMPLE 9

This example illustrates the synthesis of a phenolic foam based on a 4:1 phenol:o-cresol resole utilizing as surfactant the Pluronic P123-ditridecyl maleate surfactant (Surfactant No. 34) of Example 6.

In the foam synthesis, the following quantities of the following ingredients were combined as indicated:

| Item | Ingredient | Quantity grams |
|---|---|---|
| A | Resin C of Example 8 | 300 |
| B | CFCl$_3$ | 22.5 |
| C | CFCl$_2$CF$_2$Cl | 22.5 |
| D | Pluronic P123 - ditridecyl maleate surfactant | 15 |
| E | Catalyst A of Example 4 | 40 |

Items A through E were mixed at 15° C. in an open vessel for 15–20 seconds. The mixture was then poured into a square paper box twelve inches by twelve inches by five inches tall. A foaming reaction ensued. After a period of 300–600 seconds the material was rigid. The box and contents were placed in an oven at 55° to 75° C. for a period of ten minutes to one hour.

The foam synthesis had a cream time of 140 sec. and a firm time of 10 min. The k-factor (Btu-in/hr-ft$^2$-°F.) of the resulting foam was as follows:

| | | k-factor after | | |
|---|---|---|---|---|
| 1 day | 7 days | 14 days | 28 days | 56 days |
| .116 | .115 | .116 | .115 | .124 |

EXAMPLE 10

Ethoxylated Castor Oil-Dioctyl Maleate Surfactants in Phenolic Foams

A. METHOD OF PREPARATION OF SURFACTANTS

A series of surfactants (Surfactant Nos. 35 to 39 of Table VI below) were prepared by reacting dioctyl maleate with each of a group of ethoxylated castor oils having different ethylene oxide (EO) contents. The EO-castor oils utilized contained 20, 25, 36, 40 or 54 moles of EO per mole of castor oil and are each sold by Sellers Chemical Corporation as Flo Mo (moles EO per mole oil) C, such as Flo Mo. 20C for the product containing 20 moles EO per mole oil. Each surfactant was prepared according to the procedure of Example 6 utilizing the ingredients and amounts of the same described in said example, but replacing the Pluronics of Example 6 by the ethoxylated castor oils listed in Table VI below and employing 34 g of dioctyl maleate in each surfactant preparation.

B. FOAM EVALUATION OF SURFACTANTS

The above-described ethoxylated castor oil-dioctyl maleate surfactants were employed in the synthesis of phenolic foams based on 2:1 phenol:o-cresol resoles. Each foam synthesis was performed according to the procedure of Example 5 utilizing the ingredients and amounts of the same described in said example, but replacing the surfactants of Example 5 by the ethoxylated castor oil-dioctyl maleate surfactants listed in Table VI. The characteristics of the phenolic foams produced are shown in the following Table VI.

TABLE VI

EVALUATION OF EO-CASTOR OIL-DIOCTYL MALEATE SURFACTANTS IN RESOLE B FOAMS

| | | SURFACTANT | | RESIN B[1] | RESOLE B FOAM | | | | | |
|---|---|---|---|---|---|---|---|---|---|---|
| | | | | | k-factor[2] after | | | | | |
| Foam | No. | Physical Form | EO-Castor Oil Utilized | Viscosity 25° C. (cps) | 1 day | 7 days | 14 days | 28 days | 56 days | 120 days |
| A | 35 | viscous liquid | Flo Mo 20 C | 26,800 | .138 | .235 | | | | |
| B | 36 | viscous liquid | Flo Mo 25 C | 26,800 | .135 | .191 | .219 | | | |
| C | 37 | viscous liquid | Flo Mo 36 C | 20,000 | .123 | .121 | .128 | .124 | .125 | .132 |
| | | | | | .120 | .121 | .117 | .118 | .118 | .129 |
| D | 38 | viscous liquid | Flo Mo 40 C | 26,800 | .132 | .142 | .145 | | | |
| E | 39 | paste | Flo Mo 54 C | 26,800 | .124 | .123 | .122 | | | |

[1]Each Resin B of Table VI was prepared according to the procedure of Example 3.
[2]Units = Btu-in/hr-ft$^2$-°F.

EXAMPLE 11

Preparation of Tetronic Polyol-Maleate Diester Surfactants

This example illustrates the preparation of a series of Tetronic polyol maleate diester surfactants (Surfactant Nos. 40 to 47 of Table VII below) utilizing Tetronic polyols (alkoxylated diamines) having various molecular weights and containing a weight ratio of ethylene oxide (EO) to propylene oxide (PO) of 20:80 or 40:60. These Tetronic polyols are available from the BASF Wyandotte Corporation, Wyandotte, Mich.

Each surfactant synthesis was performed according to the procedure of Example 6 utilizing the ingredients and amounts of the same described in said example, but employing, in place of the Pluronics the Tetronics presented in the following table and employing the maleate diesters in the quantities shown in the following table.

TABLE VII

PREPARATION OF TETRONIC-MALEATE DIESTER SURFACTANTS

| SURFACTANT | | TETRONIC UTILIZED | | | MALEATE DIESTER UTILIZED | |
|---|---|---|---|---|---|---|
| No. | Physical Form | Name | Molecular Weight | EO:PO Weight Ratio | Name* | wt. (g) |
| 40 | liquid | 702 | 4,000 | 20:80 | DOM | 34 |
| 41 | liquid | 704 | 5,500 | 40:60 | DOM | 34 |
| 42 | liquid | 704 | 5,500 | 40:60 | DTDM | 34 |
| 43 | liquid | 1502 | 9,000 | 20:80 | DOM | 34 |
| 44 | liquid | 1502 | 9,000 | 20:80 | DTDM | 34 |
| 45 | liquid | 1502 | 9,000 | 20:80 | DTDM | 50 |
| 46 | solid | 1504 | 12,500 | 40:60 | DTDM | 50 |
| 47 | liquid | 1502 | 9,000 | 20:80 | DOLM | 50 |

*DOM = Dioctyl Maleate
*DTDM = Ditridecyl Maleate
*DOLM = Dioleyl Maleate

EXAMPLE 12

Preparation of Ethoxylated Castor Oil-Maleate Diester Surfactants

To a 500 ml resin kettle equipped with an overhead stirrer were added 200 g of Flo Mo 36 C (ethoxylated castor oil) and 27 g acetic anhydride. A nitrogen stream was provided through the resin kettle. After heating these ingredients to 100° C. for two hours, the acetic acid was stripped off in vacuo to yield a liquid product with an acid number of less than 2.0. To this capped material were added 50 g ditridecyl maleate and 6 g 1,1-bis(t-butylperoxy) cyclohexane (available from Witco Chemical Company under the tradename USP-400P). The mixture was then heated to 110° C. for 4 hours to yield a viscous liquid surfactant of the invention (Surfactant No. 48 of Table VIII below).

Surfactant Nos. 49 and 50 of Table VIII below were prepared according to the above procedure except that, in the synthesis of Surfactant No. 49, the maleate diester and initiator were replaced by dioctyl maleate (34 g) and t-butyl perbenzoate, respectively, and acetic acid was not stripped from the reaction mixture, and, in the synthesis of Surfactant No. 50, Flo Mo 36 C was replaced by Flo Mo 54 C.

TABLE VIII
ETHOXYLATED CASTOR OIL-MALEATE DIESTER SURFACTANTS

| SURFACTANT | | EO-CASTOR OIL | MALEATE DIESTER UTILIZED | |
|---|---|---|---|---|
| No. | Physical State | UTILIZED | Name | Wt. (g) |
| 48 | liquid | Flo Mo 36 C[1] | DTDM[3] | 50 |
| 49 | liquid | Flo Mo 36 C[1] | DOM[2] | 34 |
| 50 | paste | Flo Mo 54 C[1] | DTDM[3] | 50 |

[1] See Example 10 for description of EO-castor oils used.
[2] DOM = dioctyl maleate.
[3] DTDM = ditridecyl maleate.

EXAMPLE 13

This example illustrates the synthesis of polyisocyanurate foams utilizing as surfactant a number of the surfactants of the present invention presented in Table IX below.

In each foam synthesis, the following quantities of the following ingredients were combined as indicated:

| Item | Ingredient | Quantity (grams) |
|---|---|---|
| A | polymethylene polyphenyl isocyanate | 277 |
| B | diethylene glycol | 23 |
| C | 2,4,6-tris (dimethylaminomethyl) phenol | (See below) |
| D | potassium-2-ethyl hexoate (70% solution in E) | (See below) |
| E | polyoxyethylene glycol | (See below) |
| F | CFCl$_3$ | 55 |
| G | Surfactant (See Table IX below) | 2.5 |

A large batch of polymethylene polyphenyl isocyanate and CFCl$_3$ in the ratio 277 parts:55 parts, respectively, was prepared by mixing together the two ingredients and storing them at 0°–15° C. In each foam preparation, 332 g of the polymethylene polyphenyl isocyanate/CFCl$_3$ mixture, at a temperature of 15° C., was poured into a reaction vessel. 2.5 g of the surfactant (shown in Table IX below) and 23 g of diethylene glycol were then added to the vessel, and all ingredients were mixed at 3600 rpm for 5 seconds. The catalyst mixture (~15 g) described below was then mixed into the contents of the vessel over a 3 second interval. All ingredients were thereafter mixed at 3600 rpm for an additional 7 seconds and then poured into boxes, yielding a polyisocyanurate foam.

Various characteristics of the foams produced utilizing the catalyst mixture are shown in the following Table IX under the heading "Catalyzed Foam."

The above-described foam synthesis was repeated for each of the surfactants of Table IX, except that the catalyst mixture was not added in these additional foam preparations. By preparing the foams without the catalyst the extent of defoaming (bubble breakage) prior to and during foam rise and the size of the foam bubbles prior to firm time can be visually assessed. These observations for the uncatalyzed foams are presented in Table IX below.

In the above syntheses, Item A is a polymethylene polyphenyl isocyanate having an equivalent weight of 138, an acidity of 0.03% HCl, and a viscosity of 2000 centipoises at 25° C. and is available from the Mobay Chemical Company, Pittsburgh, Pa. under the trade name MONDUR MR-200.

Item C is that supplied by the Rohm & Haas Chemical Company under the trade name DMP-30.

Item D is employed in the form of a 70 weight % solution in the polyoxyethylene glycol (Item E) sold by the Union Carbide Corporation under the trade name Carbowax 200.

The catalyst mixture of Items C, D and E added in the above-described foam preparation is a blend of DMP-30:potassium-2-ethyl hexoate:polyoxyethylene glycol in a 1:3:8 weight ratio.

TABLE IX
SURFACTANTS IN POLYISOCYANURATE FOAMS

| | SURFACTANT | | UNCATALYZED FOAM | | CATALYZED FOAM | | | | | |
|---|---|---|---|---|---|---|---|---|---|---|
| | | | | | | | Friability | k-factor[10] after | | |
| Foam | No. | Acetic Acid Present[1] | Defoaming | Bubble Size | Cell Structure | Density (pcf) | (% wt. loss, 10 min.) | 1 day | 7 days | 14 days | 28 days |
| A | 25[2] | Yes | Some | Medium | Slightly Coarse | | | | | | |
| B | 40[3] | Yes | Significant | Large to Medium | Slightly Coarse | 1.93 | 40 | .121 | .133 | .139 | |
| C | 41[3] | Yes | Significant | Large to Medium | Slightly Coarse | | | | | | |
| D | 5[4] | Yes | Significant | Large to Medium | Slightly Coarse | 1.89 | 41 | .120 | .132 | .138 | |
| E | 7[4] | Yes | Some | Medium | Slightly Coarse | | | | | | |
| F | 43[3] | Yes | Some to Significant | Medium to Small | Slightly Coarse | 1.82 | 38 | .120 | .133 | .139 | |
| G | 45[3] | Yes | Some | Medium to Small | Slightly Coarse | | | | | | |
| H | 51[5] | No | Slight | Medium to Small | Slightly Coarse | | | | | | |
| I | 46[3] | Yes | Some | Large | Slightly Coarse | | | | | | |

TABLE IX

SURFACTANTS IN POLYISOCYANURATE FOAMS

| | SURFACTANT | | UNCATALYZED FOAM | | CATALYZED FOAM | | | | | | |
|---|---|---|---|---|---|---|---|---|---|---|---|
| | | Acetic | | | | | Friability | k-factor[10] after | | | |
| | | Acid | | Bubble | Cell | Density | (% wt. loss, | 1 | 7 | 14 | 28 |
| Foam | No. | Present[1] | Defoaming | Size | Structure | (pcf) | 10 min.) | day | days | days | days |
| J | 52[6] | No | Slight | Small | Fine | | | | | | |
| K | 49[7] | Yes | Some | Small to Medium | Slightly Coarse | 1.84 | 34 | .120 | .134 | .140 | .147 |
| L | 48[7] | No | None | Small | Fine | 1.81 | 17 | .115 | | | |
| M | 53[8] | No | None | Small | Fine | | | | | | |
| N | L-5340[9] | No | None | Small | Fine | 1.89 | 22 | .120 | .143 | .153 | .164 |

[1]From acetic anhydride capping treatment.
[2]Of example 6.
[3]Of example 11.
[4]Of example 2.
[5]Prepared in the same manner as Surfactant No. 45 of Example 11 but not capped.
[6]Prepared in the same manner as Surfactant No. 47 of Example 11 but not capped.
[7]Of example 12.
[8]Prepared in the same manner as Surfactant No. 50 of Example 12 but not capped.
[9]L-5340 = silicone surfactant available from Union Carbide Corporation.
[10]Units = Btu-in/hr-ft$^2$-°F.

EXAMPLE 14

This example illustrates the synthesis of a polyurethane foam utilizing as surfactant a polyol maleate diester surfactant of the present invention.

A. Preparation of Ethoxylated Castor Oil-Ditridecyl Maleate Surfactant

To a 500 ml resin kettle equipped with an overhead stirrer and containing 200 g of Flo Mo 36 C (ethoxylated castor oil) were added 50 g ditridecyl maleate and 6 g 1,1-bis(t-butylperoxy) cyclohexane (available from Witco Chemical Company under the tradename USP-400P). The mixture was then heated to 110° C. for 4 hours under nitrogen to yield a viscous liquid surfactant of the invention (Surfactant No. 54).

B. Polyurethane Foam Synthesis

In the foam synthesis, the following quantities of the following ingredients were combined as indicated:

| Item | Ingredient | Quantity (grams) |
|---|---|---|
| A | polymethylene polyphenyl isocyanate | 174.8 |
| B | urethane polyol | 100 |
| C | flame retardant | 30 |
| D | CFCl$_3$ | 61.9 |
| E | Surfactant No. 54 of Example 14A | 2.0 |
| F | amine catalyst | 2.0 |
| G | tin catalyst | 0.14 |

A large batch of polyol premix was prepared by mixing together items B, C, and D (ca. 1 gal) and cooling the resulting mixture to 15° C. In the foam synthesis, 191.9 g of the polyol premix at a temperature of 15° C. was poured into a reaction vessel. 2.0 g Item E, 2.0 g Item F and 0.14 g Item G were then added to the vessel, and all ingredients were mixed at 1000 rpm for ca. 10 seconds. 174.8 g Item A was then added to the vessel and all ingredients were mixed at 3500 rpm for 10 seconds, and thereafter poured into a box to yield a rigid polyurethane foam.

In the above synthesis, Item A is a polymethylene polyphenyl isocyanate having a viscosity of 150-250 centipoises at 25° C. and is available from Mobay Chemical Company, Pittsburgh, Pa. under the trade name MONDUR MR.

Item B is that supplied by the Olin Corporation under the trade name Poly G-71-530.

Item C is that supplied by the Olin Corporation under the trade name RF-230.

Item F is that supplied by Abbott Laboratories under the trade name Polycat 8.

Item G is that supplied by Cincinnati Milacron under the trade name TM 181.

The characteristics of the polyurethane foam produced are as follows:

TABLE X

Evaluation of Surfactant in Urethane

| DEN- | FRIABILITY | K-FACTOR* AFTER | | | | |
|---|---|---|---|---|---|---|
| SITY | % wt. loss, | 1 | 7 | 14 | 28 | 56 |
| pcf | 10 min. | day | days | days | days | days |
| 2.04 | 13 | .122 | .133 | .139 | .142 | .149 |

*Units = Btu-in/hr-ft$^2$-°F.

EXAMPLE 15

This example illustrates the practice of the process of the present invention on a commercial scale by reference to FIG. 1 of the drawings. The following quantities of the following ingredients are combined as indicated:

| Item | Ingredient | Parts by Weight |
|---|---|---|
| A | Polymethylene polyphenyl isocyanate | 277 |
| B | CFCl$_3$ | 49.5 |
| C | Diethylene glycol | 32 |
| D | Surfactant No. 48 of Example 12 | 2.5 |
| E | Catalyst mixture of Example 13 | 10 |

Items A, B, and D are mixed with each other and placed in the tank 11. Item C is placed in the tank 12. Item E is placed in the tank 13. The apparatus 10 is provided with kraft paper/aluminum foil rolls 30, 31. The oven 35 is heated to a temperature of 150°-200° F. The rolls 38, 39 are started, as well as the pumps 17, 18, and 19 to discharge the contents of the tanks 11, 12, 13 into the respective feed lines which carry the ingredients to the mixing head 29. The mixing head 29 deposits the foam forming mixture onto the lower substrate and both upper and lower substrates and foamable mixture are then conveyed into the oven 35 to produce a laminated structural panel 55 of the present invention.

In the above foam synthesis, the polymethylene polyphenyl isocyanate is that supplied by the Upjohn Company under the trade name Code 047.

Whereas the present invention has been described with respect to specific embodiment thereof, it should be understood that the invention is not limited thereto, as many modifications thereof may be made. It is, therefore, contemplated to cover by the present application any and all such modifications as fall within the true spirit and scope of the appended claims.

I claim:
1. In the method of preparing a cellular foam from:
A. polyisocyanurate polymer forming reactants, and
B. a blowing agent, the improvement which comprises utilizing as surfactant the reaction product of
(a) a polyoxyalkylene adduct having the formula

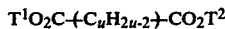
H—polyoxyalkylene chain)$_t$R, wherein R is an organic or inorganic radical and t is the number of polyoxyalkylene chains reacted onto R, and
(b) an esterified unsaturated dibasic acid having the formula $$T^1O_2C\text{-}(C_uH_{2u\text{-}2})\text{-}CO_2T^2$$

wherein u is 2 or 3 and $T^1$ and $T^2$ are identical or different and represent a straight or branched, saturated or unsaturated hydrocarbon chain, in the presence of an effective amount of a free-radical initiator and wherein the polyoxyalkylene adduct optionally is treated either before or after its reaction with the esterified unsaturated dibasic acid with a capping agent capable of reacting with the hydroxyl groups of said adduct to reduce the hydroxyl number of said adduct to less than 50.

2. The method of claim 1 wherein the esterified unsaturated dibasic acid has the formula

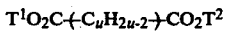
$$T^1O_2C\text{-}(C_uH_{2u\text{-}2})\text{-}CO_2T^2$$

wherein u is 2 or 3 and $T^1$ and $T^2$ are identical or different and represent a straight or branched, saturated or unsaturated hydrocarbon chain of 4 to 18 carbon atoms.

3. The method of claim 2 wherein $T^1$ and $T^2$ represent a straight or branched, saturated or unsaturated hydrocarbon chain of 8 to 18 carbon atoms.

4. The method of claim 3 wherein the esterified unsaturated dibasic acid is a member selected from the group consisting of dioctyl maleate, ditridecyl maleate and dioleyl maleate.

5. The method of claim 1 wherein t is an integer from 1 to 8 and the molecular weight of the polyoxyalkylene adduct is above about 1000.

6. The method of claim 1 wherein the polyoxyalkylene adduct is capped by treatment either before or after the free-radical initiated reaction with a capping agent capable of reacting with the hydroxyl groups of said adduct, whereby the hydroxyl number of said adduct is reduced to less than 50.

7. The method of claim 1 wherein an organo transition metal catalyst is additionally present in the free-radical initiated reaction mixture.

8. The method of claim 1 wherein the esterified unsaturated dibasic acid comprises about 5 to 40 weight percent of the free-radical initiated reaction mixture, and the initiator comprises from about 2 to 30 weight percent, based on the weight of the esterified unsaturated dibasic acid.

9. The method of claim 1 wherein the polyoxyalkylene adduct is a member selected from the group consisting of
(a) an alkoxylated amine having the formula:

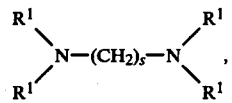

wherein $R^1$ is independently an alkoxylated chain having the formula:

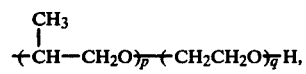

s is an integer from 2 to 10 inclusive and the ratio p:q is from 10:90 to 90:10, the molecular weight of said alkoxylated amine being from about 1500 to 12,000,
(b) a linear block copolymer of ethylene oxide and propylene oxide, the molecular weight of said block copolymer being above about 2000 and the ethylene oxide content being from about 30 to 80 weight percent, and
(c) an ethoxylated castor oil.

10. The method of claim 9 wherein the esterified unsaturated dibasic acid has the formula

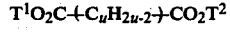
$$T^1O_2C\text{-}(C_uH_{2u\text{-}2})\text{-}CO_2T^2$$

wherein u is 2 or 3 and $T^1$ and $T^2$ are identical and represent a straight or branched, saturated or unsaturated hydrocarbon chain of 8 to 18 carbon atoms.

11. The method of claim 10 wherein the polyoxyalkylene adduct is capped by treatment either before or after the free-radical initiated reaction with a capping agent capable of reacting with the hydroxyl groups of said adduct, whereby the hydroxyl number of said adduct is reduced to less than 10.

12. The method of claim 11 wherein the capping agent is acetic anhydride.

13. The method of claim 12 wherein the esterified unsaturated dibasic acid is a member selected from the group consisting of dioctyl maleate, ditridecyl maleate and dioleyl maleate.

14. The method of claim 12 wherein
(a) the polyoxyalkylene adduct is ethoxylated castor oil, and
(b) the esterified unsaturated dibasic acid is a member selected from the group consisting of dioctyl maleate, ditridecyl maleate and dioleyl maleate.

15. The method of claim 14 wherein
(a) the ethoxylated castor oil contains from about 25 to 60 moles of ethylene oxide per mole of oil, and
(b) the esterified unsaturated dibasic acid is ditridecyl maleate.

16. The method of claim 15 wherein the ethoxylated castor oil contains from about 35 to 40 moles of ethylene oxide per mole of oil, the ditridecyl maleate comprises about 5 to 40 weight percent of the free-radical initiated reaction mixture and the initiator comprises from about 2 to 30 weight percent, based on the weight of the ditridecyl maleate.

17. The method of claim 1 wherein the polyoxyalkylene adduct is treated either before or after its reaction with the esterified unsaturated dibasic acid with a capping agent capable of reacting with the hydroxyl groups of said adduct to reduce the hydroxyl number of said adduct to less than 50.

* * * * *